United States Patent [19]

Shwez

[11] Patent Number: 4,690,224

[45] Date of Patent: Sep. 1, 1987

[54] AGRICULTURAL IMPLEMENT FOR DISPOSAL OF CROP RESIDUE

[76] Inventor: Mark Shwez, 3/13 Zahal Street, Haifa, Israel, 35052

[21] Appl. No.: 812,507

[22] Filed: Dec. 23, 1985

[51] Int. Cl.[4] ............................................. A01B 33/00
[52] U.S. Cl. ....................................... 172/45; 172/60; 172/68; 172/28; 56/60; 241/194; 241/101.7
[58] Field of Search ................... 172/68, 28, 60, 45, 172/70, 71, 72, 30; 56/60; 241/101.7, 194

[56] References Cited

U.S. PATENT DOCUMENTS

| | | | |
|---|---|---|---|
| 1,718,564 | 6/1929 | Kietzke | 172/45 |
| 2,585,296 | 2/1952 | Bennett | 172/45 |
| 2,659,188 | 11/1953 | Haban | 172/45 X |
| 3,316,865 | 5/1967 | Williams | 172/68 X |
| 3,538,987 | 11/1970 | Taylor | 172/68 |
| 3,937,285 | 2/1976 | Van der Lely | 172/68 |
| 4,044,841 | 8/1977 | Smith | 172/68 |

FOREIGN PATENT DOCUMENTS

| | | | |
|---|---|---|---|
| 128934 | 8/1948 | Australia | 172/28 |
| 817605 | 8/1959 | United Kingdom | 172/68 |

OTHER PUBLICATIONS

Woods Cultatiller Advertising brochure of Wood Bro. Inc., Oregon, Ill. 9/1972.

Primary Examiner—Richard J. Johnson
Attorney, Agent, or Firm—John S. Roberts, Jr.

[57] ABSTRACT

An agricultural implement for clearing a field of crop residue after harvest is attached to the linkage of a tractor and serves to cut and shred stalks of plants planted in two parallel rows. It comprises two sheave-shaped rollers on a common axle serving to crush the stalks and to flatten them onto the ground, and two flail-type fast-rotating shredders whose cutter bars cut and shred the stalks pressed on the ground by the rollers, while slightly penetrating in to the soil surface and cutting the upper root portions as well. Each shredder consists of a drum with pivotally attached cutter bars; both shredders are mounted on a horizontal shaft which is driven by the tractor power-take-off through a gear. A casing collects the shredded particles and spreads them on the ground behind the implement.

2 Claims, 8 Drawing Figures

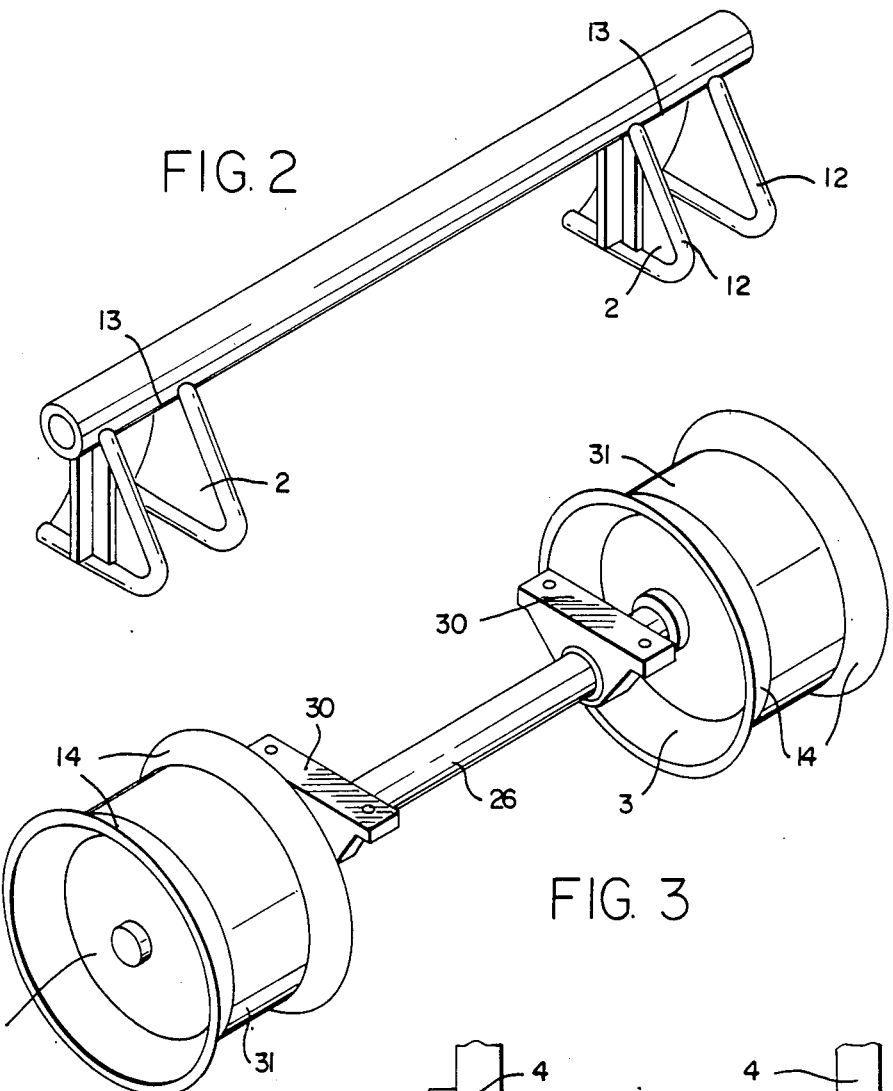
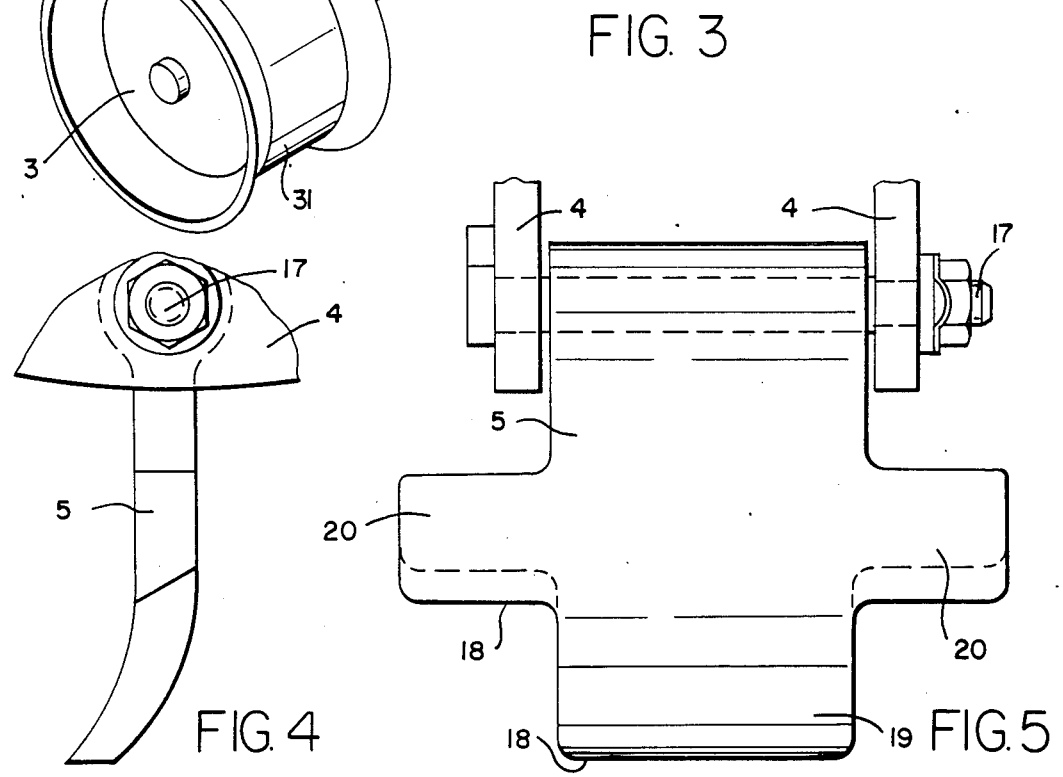

AGRICULTURAL IMPLEMENT FOR DISPOSAL OF CROP RESIDUE

BACKGROUND OF THE INVENTION

The invention relates to an implement adapted to clear a field of crop residue after harvest, by first flattening the plant stalks onto the ground and subsequently cutting and shredding them.

The plants of cotton and corn, as well as the stubble and straw of wheat and rice are left in the field after the crops have been harvested. The residue of one crop must be disposed off in some manner before seedbed preparation begins for the next crop. Burning of the residue has long been a thorough way, but this is now in disfavor because soil-improving practices show the need for returning all crop residue to the soil.

In the past several types of implements have been developed for residue removal, and these can be essentially classified as follows: 1. The radial-rotating-knife cutter-shredder; 2. The horizontal-rotating-knife cutter-mower; 3. The flail-type stalk shredder and 4. The stalk-and-root extracting and shredding implement.

The first two types do not actually shred the residue, but only mow or chop it. The flail-type stalk shredder does, in fact, do some shredding, but it does not thoroughly comminute the stalks, since the operation is haphazard and not controllable. On the other hand, the stalk-and-root extracting implements containing a shredder, which are preferably employed for clearing cotton fields, are highly efficient and leave a clean field after passage; they are, however, highly intricate and, accordingly, heavy and costly, besides of their high energy consumption.

The present invention has the object to provide an implement for crop residue disposal by cutting and shredding it, while only leaving a small root portion in the soil.

It is another object to provide an implement that is of relatively small dimensions that can be readily attached to an agricultural traction vehicle and be power-operated by means of the power-take-off shaft of the vehicle.

And it is a further object to provide an implement of light weight and simple construction and, accordingly, of low cost.

SUMMARY OF THE INVENTION

The implement of the invention serves to cut and shred the stalks of plants growing in parallel rows, such as cotton or corn, by first bending and pressing the stalks flat onto the ground by roller means, and subsequently cutting and shredding them by means of a fast-rotating drum provided with a plurality of pivoted, free-swinging cutter bars, which are positioned in the implement in such a manner that they penetrate into the uppermost layer of the soil, for the sake of thorough shredding of the stalks.

The implement is preferably attached to a tractor pulling or pushing it across a field, while the cutter drum receives its rotary motion from the power-take-off shaft via suitable transmission means. The implement is preferably designed to clear from two to five rows of plants, but in case a larger number of rows should be worked simultaneously, it is proposed to make it self-propelled driving its power from an IC-engine mounted on top of the implement.

A preferred embodiment of the implement adapted to simultaneously clear two rows of plant stalks, comprises a frame attachable to the three-point-linkage of a tractor, two heavy, co-axial and spaced-apart rollers in the front portion of the frame, and two co-axial, spaced-apart rotatable shredders, each shredder consisting of a drum having cutter-bars pivotally attached to its circumference, each shredder being positioned immediately behind and co-planar with the rollers, the two rollers and the two shredders being respectively spaced from each other by a distance co-extensive with the distance between two adjoining rows of plants. The shredders are preferably attached to a common horizontal shaft which receives its rotary motion from the power shaft of the tractor via a suitable gear system, or via a gearbox and a belt drive.

For improved operation the implement is provided with front guides serving to gather the stalks into the center of the rollers, thus preventing any stalks from being left standing in the field.

The implement is advantageously covered by a casing serving to prevent the shredded particles from flying in all directions and to collect them in the casing rear, from where they exit through a transverse slot in the rear and are evenly distributed across the entire width of the casing.

With a view to collect the stalks pressed down by the rollers into more compact bundles or swaths, the rollers are centrally grooved in the shape of sheaves with both outer rims protruding outwardly.

The implement may be built to contain from two to five sets of rollers and shredders, suitable for working from two to five rows of plants, but for simplicity's sake an implement for only two rows is being illustrated and described in the following.

SHORT DESCRIPTION OF THE DRAWINGS

FIG. 1 is a side view of an implement according to the invention during operaion in a field, FIG. 2 is a perspective view of a pair of frontal guide means serving to gather the stalks and to guide them into the center underneath the two rollers, FIG. 3 is a perspective view of a shaft carrying two rollers in the shape of sheaves, FIG. 4 is a side view of a cutter bar and its attachment to a potion of a rotatable shredder drum, FIG. 5 is a front view of the cutter bar of FIG. 4, FIG. 6 is a top view of the implement illustrated in FIG. 1, adapted to work two rows of stalks, FIG. 7 is a rear view of the implement illustrated in FIGS. 1 and 6, showing its attachment to a tractor linkage; and FIG. 8 is a side view of the implement of FIG. 7 and of a tractor, showing the attachment of the implement to the tractor linkage and the power transmission from tractor to the rotating shaft of the implement.

DESCRIPTION OF A PREFERRED EMBODIMENT

Figure 7:
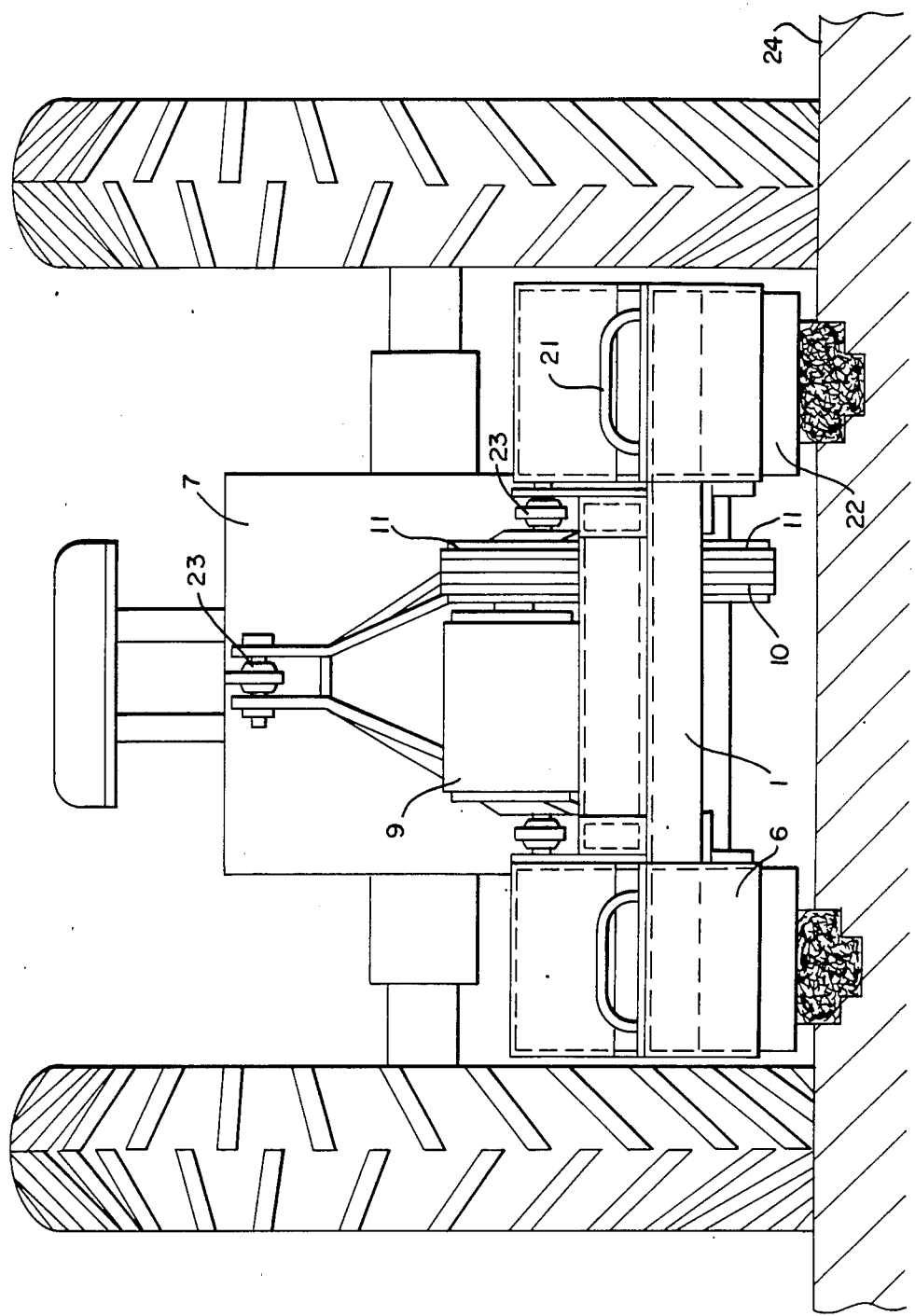
Figure 8:
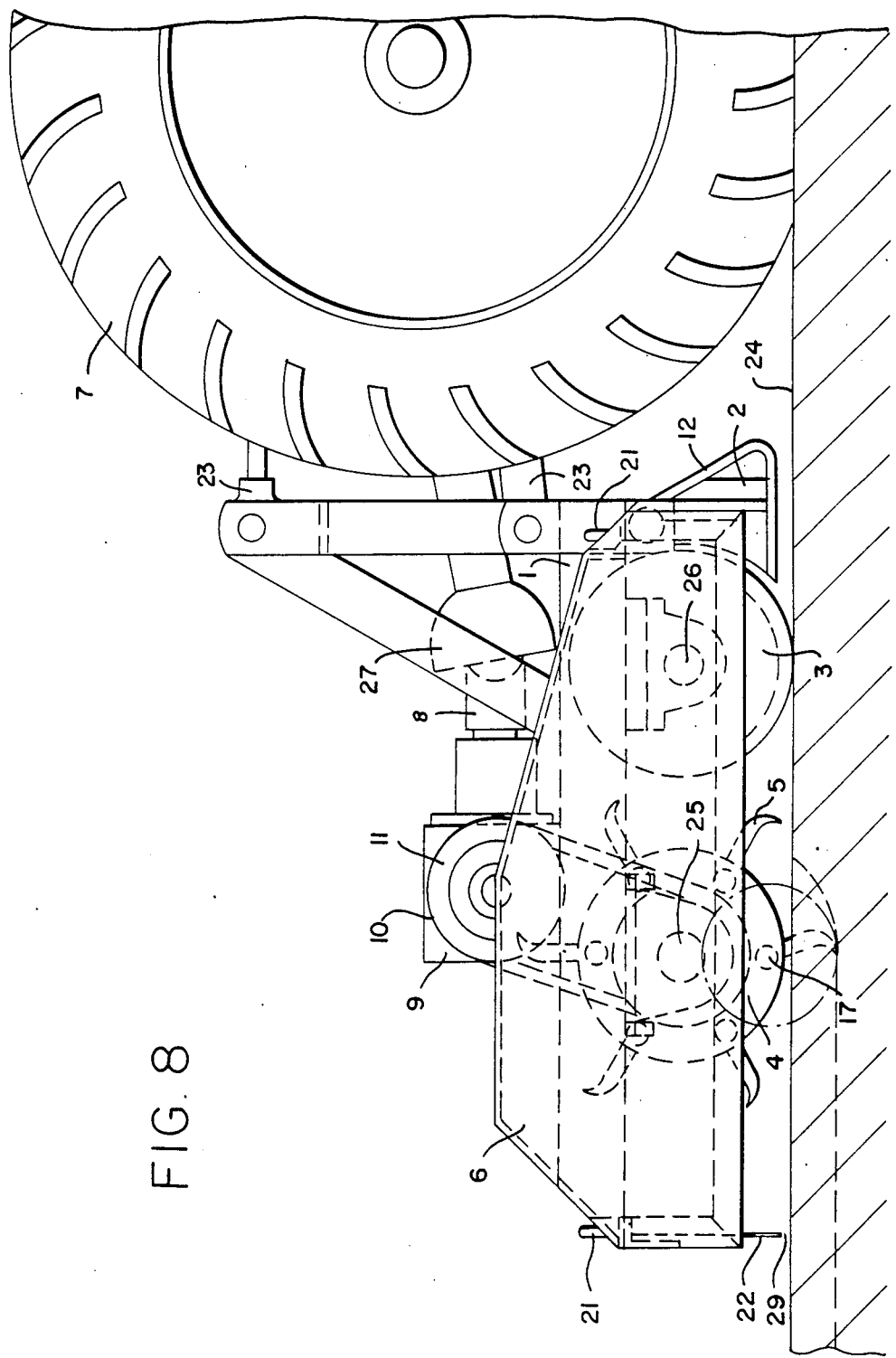

With reference to the drawings, an implement adapted to work two parallel rows of plant stalks essentially comprises: a rectangular frame 1; two rotatable shredders each consisting of a cutter member having spaced discs 4 provided with six pivotally attached cutter bars 5 and positioned on a common shaft 25; and two sheave-shaped rollers 3 mounted on a common axle 26 in front of the shredders. The rollers are pressed down onto the soil and the stalks by the weight of the implement or, in case increased pressure is required, they may be heavy by pouring lead into their interior or by making them of solid steel. As shown in FIGS. 7 and 8, the implement is attached to the three-point-hitch 23 of a tractor 7, which permits, on the one hand, to exert a downward pressure on the rollers 3 via the frame 1 and, on the other hand, to lift the implement off the ground while transporting it between sites.

The shaft 25 carrying the rotatable shredders 4 receives its rotary motion from the power-take-off of the tractor, which is coupled to the input shaft of a transmission gear 9 and a belt drive 10,11,11'. The transmission is coupled to the power-take-off by a drive-shaft 8 and a universal joint 27. The belt drive consists of a drive pulley 11 mounted on the output shaft of the transmission gear 9, a driven pulley 11' mounted on the drum shaft 25, and drive belts 11 transmitting the torque from pulley 11 to the pulley 11' and therethrough to the shredders.

Two guide frames 2, 12 are provided to the front of the implement, one each in central alignment with the respective roller, which serve to grasp the stalks and to concentrate them into the center plane of the rollers, in order to create dense swaths or bundles for subsequent efficient cutting by the rotating cutter bars.

The rollers and shredders on each side of the implement are protected by two covers 6 which may be placed or removed with the aid of handles 21. A height-adjustable rear gate 22 serves to arrange the width of a slot 29 through which the shredded plant parts emerge into the open and form a continuous strip along the worked row.

Details of the working parts are illustrated in the drawings appearing on Sheet 2: Herein FIG. 2 shows the guide assembly 2 which is adapted to be readily fastened to the front of the implement by a horizontal bar or tube 13. It consists of two pairs of triangular guides 12 which are integral with the bar 13 symmetrical in relation to the position of the rollers 3.

FIG. 3 shows the roller assembly in the form of two rollers 3 rigidly fastened to an axle 26 which latter is rotatably supported by two bearings 30. Each roller contains a central portion 31 and two outwardly raised rims 14, creating a sheave-like shape of the roller which is thus capable of concentrating the stalks along the central portion, to permit the cutter bars to cut into thicker bundles of stalks for improved shredding.

FIGS. 4 and 5 illustrate one of the cutter bars 5 pivotally fastened to the respective drum 4 by means of a pivot bolt 17. The cutter bar is of a width co-extensive with the width of the roller 3, the symmetry center of both roller and cutter lying in the same vertical plane. Its central portion 19—which is of a width about equal to the width of the central portion of the roller—extends to a greater distance from the pivot than the two side portions 20, the outer edges of all three portions being shaped to form sharp knife edges 18 and 18' respectively. This shape permits the central portion to cut into the soil for the purpose of cutting the upper root portions, while the side portions cut the stalks without, however, penetrating into the soil proper.

Figure 1:
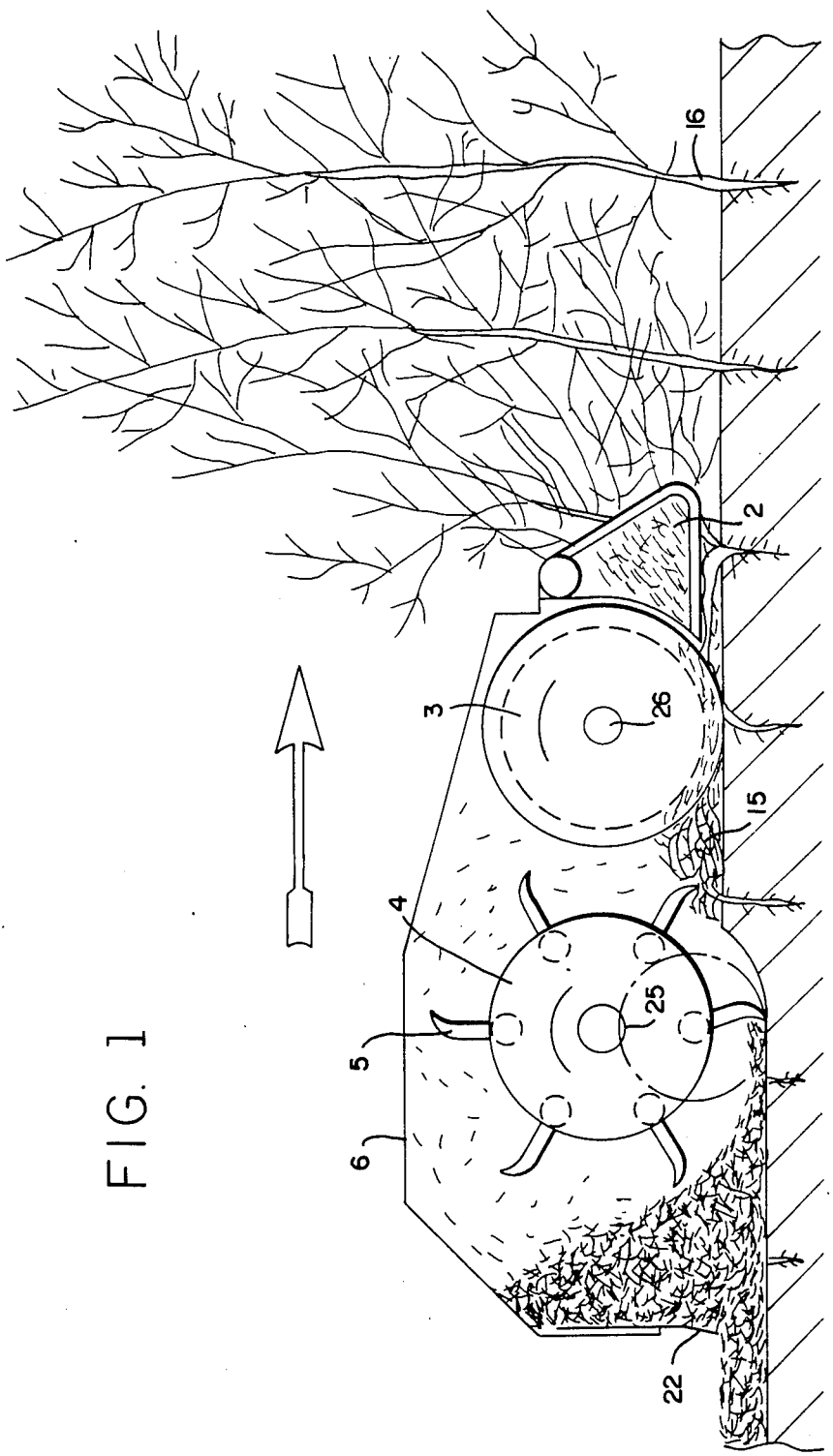
Figure 6:
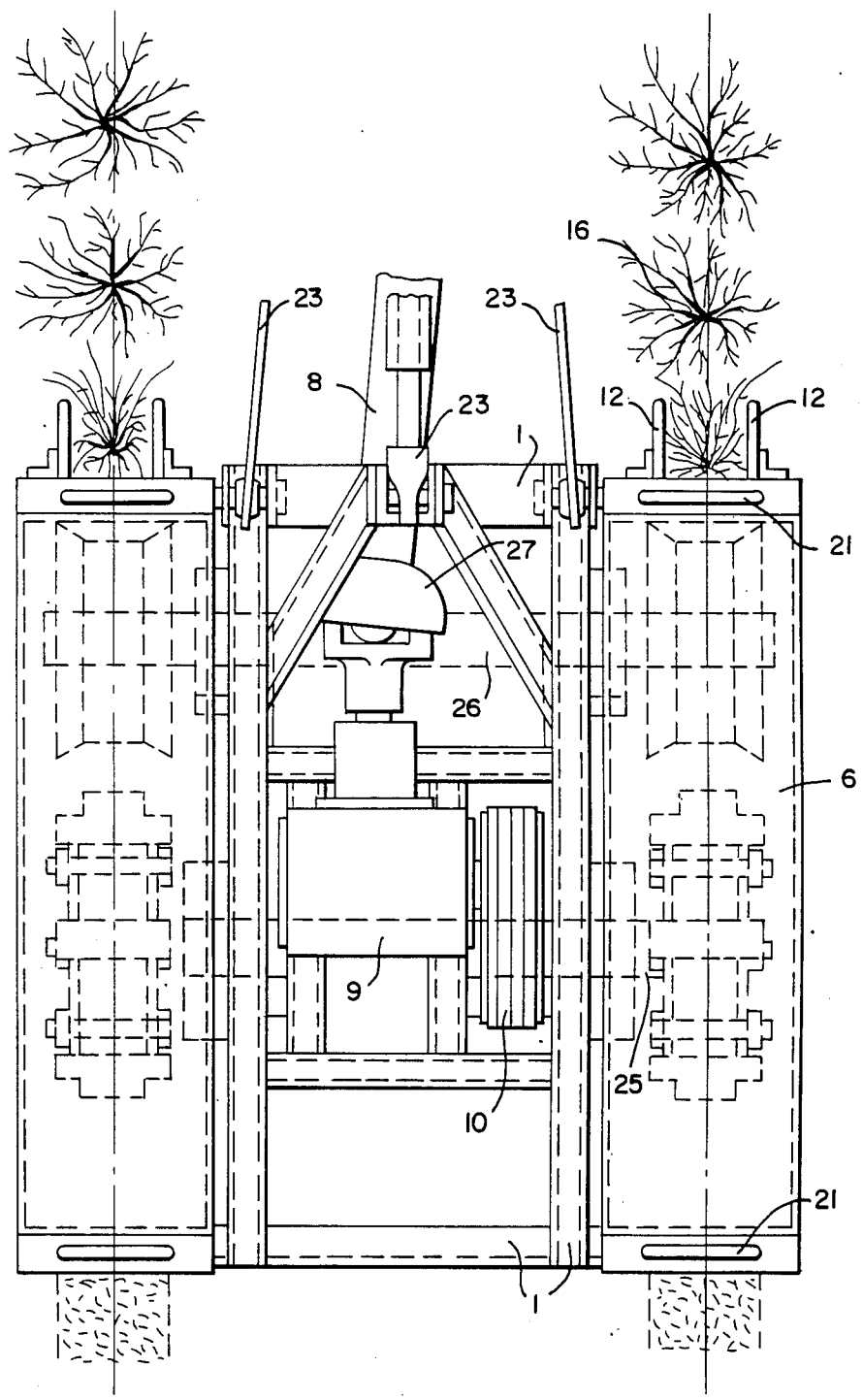

The operation of the implement is clearly depicted in FIG. 1, wherein only the working parts, viz. the rollers and the shredders are shown, while the tractor and the power transmission are omitted in order not to obscure the picture.

The implement is moved across the field in the direction of the arrow—above the implement—along the rows of plant stalks 16. The guide means 2 concentrate the stalks into the center plane of the rollers 3 and cutter member having spaced discs 4, where they are bent forwardly and pressed onto the ground by the rollers 3. The sheave-like shape of the rollers further concentrates the stalks into the central roller portion, thus forming thick bundles or swaths of the stalks lying on the ground. While the stalk tops are still underneath the rollers, their ends, close to the roots, are cut, and the remaining length is shredded by the cutting edges of the cutter bars 5 which are rotated at considerable speed by the drums 4. In a manner known from flail-type shredders the cutter bars are brought into more or less radial position by the centrifugal forces acting thereon, but they lend themselves to be bent backwards whenever they encounter especially hard material, pebbles or the like obstructions. The cutter bars are of stepped configuration as visible in FIG. 5, and the drum shaft 25 is positioned at a suitable height permitting only the central portion 19 of the cutter bars to penetrate into the top layer of the soil, while the side portions 20 and their cutting edges 18' remain just above ground level. The purpose of this arrangement is to cut the top portions of the plant roots by the central cutter portion only, thus saving energy and reducing the traction resistance.

The shredded particles are thrown into the surrounding space inside the casing 6 by the fast-rotating cutter bars and are eventually gathered in the rear portion of the casing, from where they emerge into the open through the slot between the gate 22 and the ground. As mentioned before, the gate is adjustable to ensure even distribution of the particles across the casing width.

As an alternative, the slot may be so formed as to convey the shredded particles into the groove dug by the central portion 19. The groove filled with plant residue will be covered with soil during the following operation, thus providing satisfactory fertilization of the soil. With a view of still better intermixing the soil and the plant residue, it is proposed to attach a plow-share to the rear of each shredder, in line with the central, longer portion 19 of the pivoted cutter blades, serving to plow the residue underground.

The implement is suitable for clearing any field containing residue of plants growing in parallel, equidistant rows, such as cotton, corn, or rice, as well as other plants of which only the top parts are harvested, while the stalks are left standing in the field.

The advantage of the implement compared with existing agricultural machines of the kind, is its simplicity and capability to clear the field thoroughly. It is pointed out that the wheels of the tractor pulling or pushing it, travel in portions between the plant rows, so as not to interfere with ready operation. However, even in case the tractor wheel should pass across the stalks, these would be likewise cut and shredded by the cutter bars.

I claim:

1. An agricultural implement for clearing a field of residue of plants growing in parallel rows and adapted to simultaneously clear at least two rows of plant stalks, comprising
 a frame provided with means for its attachment to an agricultural traction vehicle adapted to move said implement across a field along said rows of plant stalks, said frame having a front end and a rear end,
 at least two rollers rotatably fastened in the front portion of said frame on horizontal axle means positioned at right angles to the direction of travel of said implement, at least two laterally spaced rotating shredders positioned in the rear portion of said frame, one shredder behind each of said rollers, each shredder comprising a pair of laterally spaced discs having a plurality of cutter bars pivotally attached to its circumference, said discs being positioned at a height above ground level so as to permit at least a portion of each cutter bar to penetrate into the upper layer of the soil, drive means for forcefully rotating said shredder discs and said cutter bars, the implement being characterized by the improvement wherein each said cutter bar has a central portion positioned laterally between said discs and extends radially outwardly to a cutting edge beyond the circumference of said discs and has two side portions extending laterally beyond the sides of the discs spaced radially inwardly from the cutting edges, permitting said central portion to penetrate into the soil, and said side portions to rotate close to and above the ground level.

2. The agricultural implement as defined in claim 1, characterized by the provision of a stalk-guide assembly in front of each said roller adapted to gather standing plant stalks and to convey then to the central portion of said roller.

* * * * *